SPINDLE FOR RECORD CHANGER

Filed June 13, 1966 3 Sheets-Sheet 1

INVENTOR.
WILLIAM A. FORDECK and
CARL R. HART
BY
Woodard, Weikart, Emhardt & Naughton
Attorneys Feb. 20, 1968 W. A. FORDECK ETAL 3,369,815

SPINDLE FOR RECORD CHANGER

Filed June 13, 1966 3 Sheets-Sheet 2

INVENTORS.
WILLIAM A. FORDECK and
CARL R. HART
BY
Woodard, Weikart, Emhardt & Naughton
Attorneys Feb. 20, 1968 W. A. FORDECK ETAL 3,369,815

SPINDLE FOR RECORD CHANGER

Filed June 13, 1966 3 Sheets-Sheet 3

INVENTOR.
WILLIAM A. FORDECK and
CARL R. HART

BY

Woodard, Weikart, Emhardt & Naughton
Attorneys

United States Patent Office 3,369,815
Patented Feb. 20, 1968

3,369,815

SPINDLE FOR RECORD CHANGER

William A. Fordeck, Garrett, and Carl R. Hart, New Haven, Ind., assignors to The Magnavox Company, Fort Wayne, Ind., a corporation of Delaware Filed June 13, 1966, Ser. No. 557,172
28 Claims. (Cl. 274—10)

ABSTRACT OF THE DISCLOSURE

A spindle assembly including a first set of record supporting lugs projecting radially from a stationary post and a second set of lugs retracted into said post, a sleeve on said post and apertured to accommodate said lugs, the margins of the apertures being cam contoured to engage and operate the lugs of both sets during limited rotation of the sleeve on the post for dropping one record at a time from a stack, the limited rotation for record change being attainable manually or automatically. An adapter for large aperture records, and including an adapter body mountable on the spindle sleeve and an adapter sleeve mountable on the spindle post, with record support lugs operable by limited relative rotation between the adapter body and adapter sleeve caused by the relative rotation between the spindle sleeve and spindle post, to which the adapter body and adapter sleeve, respectively, are keyed.

The present invention relates to sound reproducing machines and more particularly relates to a record-supporting and releasing spindle for sound reproducing machines.

Conventional phonographs are provided with a spindle mounted concentrically with the turn table for centering records having relatively small apertures. Most of the conventional commercial spindles adapted to support a stack of records have changer arms associated with them. The art has so advanced, that spindles have been designed which both support a stack of records and release one record at a time, obviating the need for a changer arm. However, these devices are complex and expensive, and few have met with commercial success. The present invention provides a simple and improved record-supporting and releasing spindle.

Therefore, it is an object of the present invention to provide an improved record-supporting and releasing means.

It is an object of the present invention to provide a record-supporting and releasing spindle which operates either manually or automatically.

It is a further object to provide apparatus which will work properly with records of different thicknesses.

A further object is to provide apparatus useful with conventional changer driving mechanisms.

A further object is to provide a record-supporting and releasing spindle which may be adapted readily for use with records having large central apertures.

In accordance with one embodiment of this invention, the usual record changer balance arm is omitted and there is provided a novel record-supporting spindle. The spindle includes a vertical center post coupled at a lower end to an operating arm arranged for actuation by conventional changer mechanism under the baseplate for limited rotation of the center post to accomplish the automatic drop of the lowermost record on the spindle. The spindle includes a sleeve surrounding the post and having its lower end affixed to the record player baseplate.

Lower and upper sets of retractable record-supporting members are mounted on the post and are arranged with respect to the sleeve so that either the lower or upper set is extended, providing radially projecting lugs for supporting the stack of records on the spindle. The lower group is for normal support of the record stack while a record is being placed. The upper set of lugs, which are normally retracted, are extended during retraction of the lower set, in order to support the stack of records while the lowermost record is dropped onto the turntable.

The extension and retraction of the record support lugs is caused by relative rotation of the post with respect to the sleeve, effecting rotary action of the support members on their vertical shaft axes. To implement this, the support lugs project horizontally from shafts mounted in the post and retained by the sleeve. The sleeve is provided with circularly spaced apertures receiving the lugs and having side margins engaging the lugs so that as the post is rotated with respect to the sleeve during one change cycle the lower set of record support lugs is cammed inwardly by the sleeve while the upper set is cammed outwardly by the sleeve, and vice versa upon reversing rotation of the post with respect to the sleeve to again prepare the spindle to drop the next record during the next change cycle of the mechanism.

The arrangement is such that release of the records in this manner can also be done manually with ease, whenever desired, by simply turning a knob at the top of the post. This knob is exposed and can be grasped readily by the fingers for this purpose. Moreover, because of the arrangement of the record support members and their mounting and the contours of the apertures in the sleeve, the entire stack of records can be removed from the turntable after the records have been played, by a simple upward movement without any manual operation of the changer mechanism, and regardless of the position of the changer mechanism.

The full nature of the invention will be understood from the accompanying drawings and the following description and claims.

Figures 1, 1A, 2, 3:
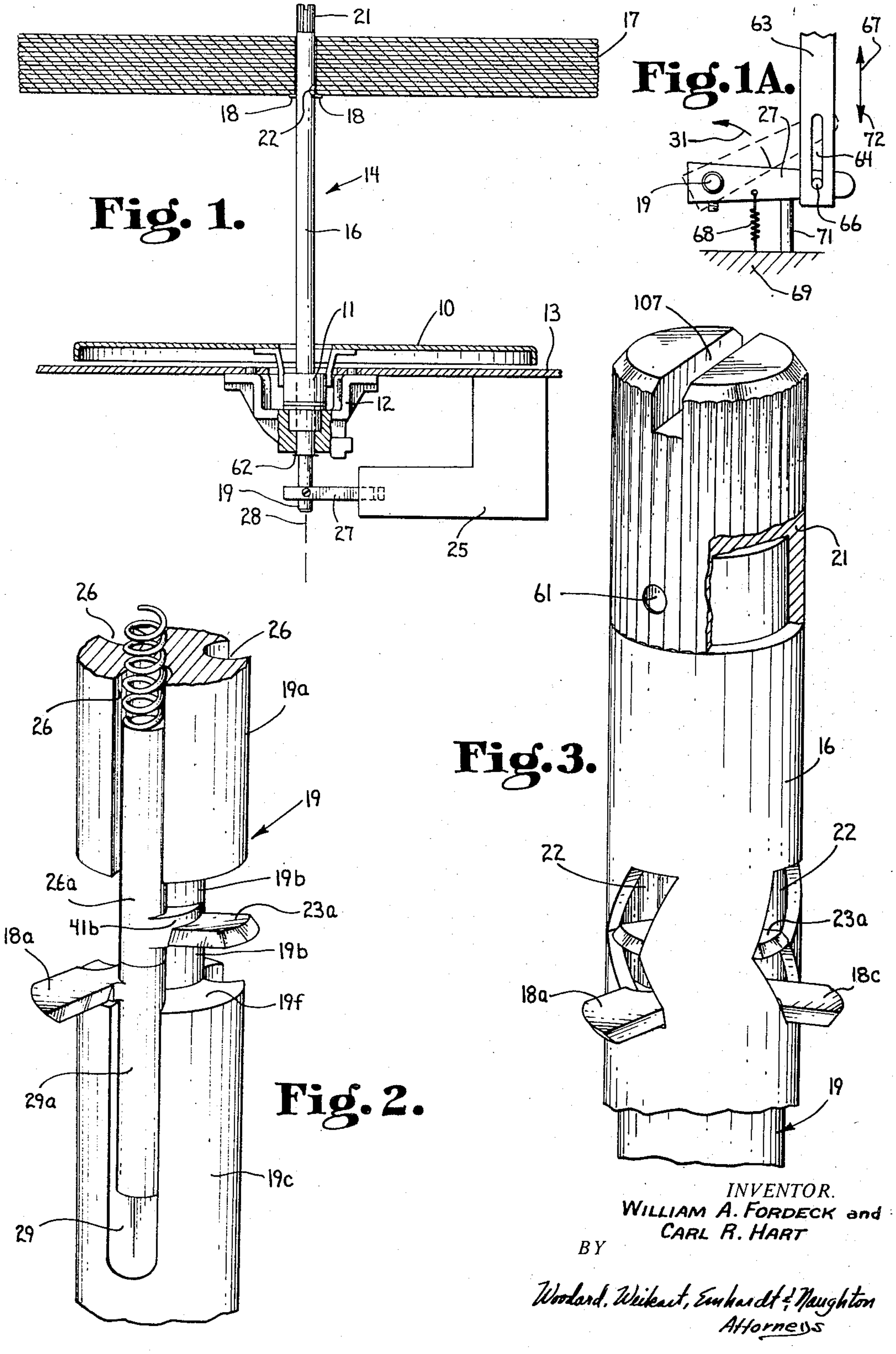
FIGURE 1 is a side view (on a reduced scale) of the record-supporting and releasing spindle of a typical embodiment of the invention, showing the spindle in relation to a stack of records, the turntable, and baseplate of the record player.
FIGURE 1A is a fragmentary top plan view of the spindle post operating lever arm and operating link from the changer mechanism.
FIGURE 2 is a pictorial view (greatly enlarged) of a portion of the spindle assembly itself.
FIGURE 3 is a fragmentary pictorial view on the same scale as FIGURE 2 and showing a portion of the spindle assembly including the post, two record support members, and one of the positioning springs.

Referring now to the drawings in detail, and particularly to FIGURE 1, a record player-changer apparatus is shown on a reduced scale, and includes a turntable 10 mounted on a hub 11 rotatably supported on the member 12 affixed to the usual baseplate 13 of the machine.

The spindle assembly 14 includes a sleeve 16 which, in this embodiment, is press fitted into member 12 so that the spindle assembly stands up above the center of the turnable. A stack of records 17 is supported by a plurality of retractable lower record support lugs 18.

Referring now to FIGURES 2 and 3, along with FIGURE 1, the spindle assembly 14 includes a center post 19, which can be solid as shown or tubular or any construction suitable for the purpose, and the spindle assembly also includes the sleeve 16. The top portion of the post has a splined or knurled cap 21 affixed thereto which facilitates manual actuation of the record releasing mechanism by merely a twist of the cap with the fingers. Of course the release mechanism normally operates automatically. The sleeve 16 has three identical circularly spaced apertures 22 therein, through which three sets of lower and upper record support lugs 18 and 23, respectively, may extend to support records.

The upper portion **19*a* of the central post 19 has three circularly-spaced vertical grooves 26 around the periphery thereof for receiving identical shafts 26*a*, 26*b*, and 26*c*, which are integral with the retractable upper support lugs 23*a*, 23*b*, and 23*c*, respectively. The intermediate portion 19*b* of post 19 is of a diameter much smaller than that of the top portion 19*a*. The lower portion 19*c* of the post is an elongated portion having the same diameter as the top portion 19*a*, and may extend out through the bottom of the spindle assembly as shown in FIGURE 1. It has a lever 27 affixed to the lower end for connection to and operation by any suitable conventional changer mechanism during a record change cycle to turn the post a limited amount on its axis 28. Because so many conventional mechanisms suitable for this purpose are well known, this is designated by block 25** in FIGURE 1.

The lower portion **19*c* of the post has three vertical grooves 29 about its periphery, these grooves being aligned with grooves 26 of the top post portion, so that the axes of the lower and upper aligned grooves are colinear. The lower grooves receive shafts 29*a*, 29*b*, and 29*c* which have the retractable lower record support lugs 18*a*, 18*b*, and 18*c*, respectively, thereon. These lugs are adapted, when extended as in FIGURES 1 through 4, to support the lowermost record of a stack of records and thereby support the entire stack. Therefore, these provide the primary support for the record stack. The upper support lugs 23*a*, 23*b*, and 23*c*** are adapted, when extended as in FIGURE 6, to engage the underside of the second lowermost record of the stack of records while the lowermost record is dropped onto the turntable during a change of records. Because these lugs normally support the stack only during the period while the lower lugs are retracted to drop the lowermost record, the upper lugs may be referred to as providing the secondary support for the record stack. As a matter of convenience in manufacture, the six record support lugs and their shafts can be identical parts, but the upper three are merely inverted.

Figures 4, 5, 6:
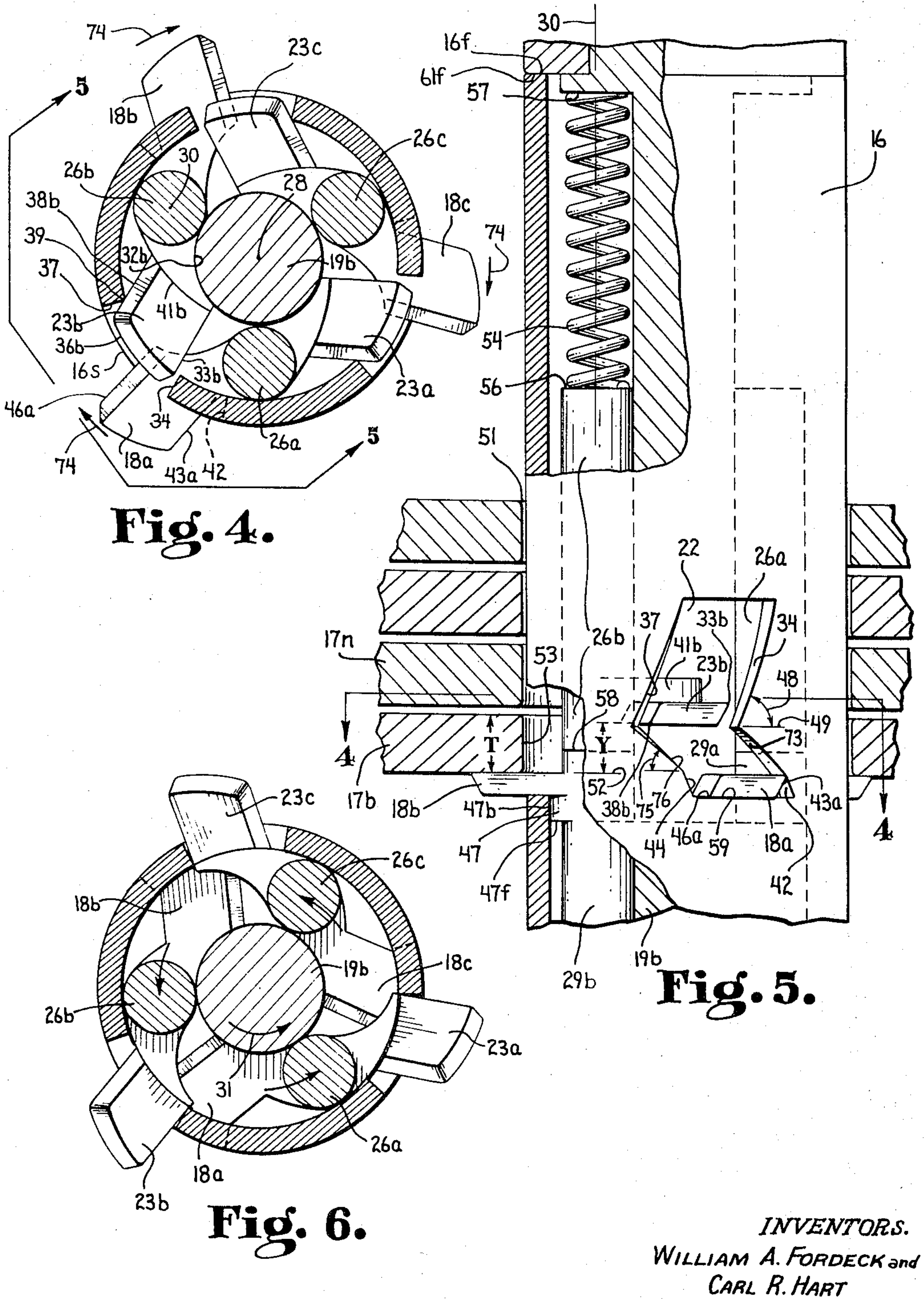
FIGURE 4 is a cross-section through the spindle assembly (on a still larger scale than FIGURES 2 and 3) with the lower support lugs extended and the upper support lugs retracted, the section being taken at the line 4—4 in FIGURE 5 and viewed in the direction of the arrows.
FIGURE 5 is a fragmentary elevational view (partially in section) and looking in the direction of the arrows 5—5 in FIGURE 4, showing the spindle assembly supporting a stack of records.
FIGURE 6 is a cross-section like FIGURE 4 with the upper support lugs extended and the lower support lugs retracted.

It was previously mentioned that three equally spaced apertures 22 are provided for the record support lugs, and in FIGURE 5 the typical location of two lugs with respect to a single one of these apertures when the upper lugs are retracted, can be observed. The purpose and effect of the contour of the aperture will be best appreciated if a person considers that the lower lugs are to be retracted and the upper lugs are to be extended when the post 19 turns with respect to the sleeve in the direction of the arrow 31. For reference purposes this direction of post rotation may be referred to as a "first" or "forward" direction. Similarly, although the apertures 22 have top, bottom, and side marginal edges, if we assume the post has a point on its periphery and located in the aperture, the aperture side edge approached by that point during post rotation in the "forward" direction will be referred to as a "front" edge, and the other side edge will be referred to as a "rear" edge. The extent of this turning of the post to drop the bottom record of the stack can be 35°. However, this is only an example, as the degree of rotation of the post from a "support" position wherein the lower lugs can support a record, to a "release" position wherein the lower lugs are retracted to the extent that they can no longer support a record, can be varied considerably by selection of dimensions and angles, within the scope of this invention. Also it will be recognized that the invention may be practiced by fixing the post and turning the sleeve. To describe the effect of post rotation, reference will be made first to the action on support lug **23*b*** appearing in FIGURES 4 and 5.

The support member of which lug **23*b* is a part, includes the shaft 26*b* extending upwardly therefrom and confined in the appropriate groove in the post by means of the sleeve. The groove, being semicircular in cross-section and fittingly receiving the shaft, assures that the shaft can rotate properly on an axis 30 parallel to post axis 28 and fixed with respect to the post, and that the shaft can do so without wobbling of the shaft or its axis. The support lug 23*b* is normally retracted as best shown in FIGURE 4 whereupon the curved inner surface 32*b* thereof behind the lug 23*b* abuts the outer cylindrical surface of the intermediate portion 19*b* of the post. The front marginal edge 33*b* of the lug is disposed in closely spaced relationship to the front edge 34 of the particular aperture 22 in which the lug 23*b* is received. The outer marginal edge 36*b* of lug 23*b* is concentric with the face 32*b* and with the outer cylindrical surface 16*s* of the sleeve 16 and is disposed at a slightly smaller radius with respect to the axis 28, than is the radius of the sleeve surface 16*s*, to avoid any impediment to free movement of the records up and down along the sleeve so long as the lug 23*b* is retracted. To aid in assuring that this relationship is maintained, the upper rear edge 37 of the particular aperture 22 engages the rear marginal edge 38*b* of the support lug 23*b* at the point 39** (FIGURE 4).

Upon initiation of movement of the post rotationally in the direction of the arrow 31, the front edge **33*b* of the support lug 23*b* will engage the sleeve aperture upper front edge 34 and can move no further in rotation with the post 19. Accordingly, further turning of the post will cause the lug to be forced outward by the sleeve edge 34 toward the position shown in FIGURE 6. At this time, the abutment surface 41*b* of the support member, which projects upwardly from the lug 23*b* for a short distance as shown in FIGURE 5, may come into abutting relationship with the inner cylindrical surface of the sleeve adjacent the aperture to prevent further outward motion of the lug 23*b*. Normally the connection of the lever arm 27 at the bottom of the post 19 to the changer mechanism 25 is arranged such that there will be no tendency of the post to turn to such as extent that it is necessary to rely on the abutment surface 41*b* in order to stop outward travel of the support lug 23*b***.

The action which has just been described with reference to the lug **23*b* occurs simultaneously and in the same way with respect to lugs 23*a* and 23*c*. Retraction of these lugs is accomplished in much the same way by simply returning the post to its original position by turning it backward, opposite the direction of the arrow 31, whereupon the aperture upper rear edge 37 engaging the rear edge 38*b* of lug 23*b* cams it back into the position shown in FIGURE 4. The same action takes place simultaneously with lugs 23*a* and 23*c***.

The same type of action as described above takes place with reference to the lower record support lugs. For example, when the post turns forward in the direction of the arrow 31, the sleeve being stationary, the aperture lower front edge 42 engages the front marginal edge 43*a* of the lug 18*a* and turns this lug inwardly toward the post until it is retracted as shown in FIGURE 6. The same action simultaneously takes place with the lugs 18*b* and 18*c*. Then, after a record has been dropped, the aperture edge 44 engages the rear marginal edge 46*a* of the lug 18*a* and, as the post turns backward to its original position (turning opposite the arrow 31) the sleeve aperture lower rear edge 44 cams the lug 18*a* back out to the position shown in FIGURE 4. The same action simultaneously takes place on the lugs 18*b* and 18*c*.

Because the lower support members can be identical in construction to the upper support members, they too are all provided with abutment surfaces like surface 41*b* to which the upper support lug 23*b* is joined. However, in the case of the lower support members, because they are inverted, these abutments extend downwardly therefrom and as illustrated in FIGURE 5, they can thereby readily serve to prevent excessive outward extension of the lower support lugs, abutment surface 47*b* being provided at the root of lower support lub 18*b* and abutting the inner cylindrical surface of the sleeve 16 when the lug is extended as shown.

Referring further to FIGURE 5 and considering the action which has previously been described, it should be apparent that the records in the stack cannot be supported by retracted support members at all and it is indeed desirable that they be able to freely pass any retracted support member. Therefore, while the lower support lugs are extended, the upper support lugs are retracted but when it is desired to drop the lowermost record 17*b*, for example, the lower support lugs must be retracted. As is well known, it is necessary to temporarily support the remaining records of the stack in order to avoid the dropping of the entire stack while the lower supports are retracted. It is also apparent that records can vary somewhat in thickness so it is necessary that the upper support lugs be able to adapt to some variation in thickness in order to successfully move between the lowermost record 17*b* and the next lowermost record 17*n* before the lower support lugs are retracted completely. For this purpose, the aperture edges are disposed at angles with respect to the vertical. More specifically, the aperture edge 34 which serves to cam the lug 23*b* outward as lug 18*a* is being retracted, is disposed at an angle 48 measured counterclockwise with respect to a horizontal plane 49 tangent or nearly tangent the lower face of the upper support lugs. This angle will be referred to as the "compliance" angle. The vertical distance "Y" between the upper faces of the lower support lugs 18*a*, 18*b*, and 18*c*, and the lower faces of the upper support lugs 23*a*, 23*b*, and 23*c*, is established at an amount somewhat less than the minimum thickness which can be expected at the central opening 51 for any of the records of the stack. Therefore the rear edge 38*b* of the lug 23*b*, for example, and which, along with outer edge 36*b* is expected to lead into the space between the two bottom records 17*b* and 17*n*, is at a certain distance above the plane 52 of the upper faces of the lower support lugs. This distance, which is only slightly greater than the distance "Y" because of the slight rounding of the leading edge 38*b* to avoid a sharp knife edge, is also less than the minimum thickness "T" at the central aperture of any record of the stack. It is usually a little less than .060 inch but this will, of course, depend on the minimum thickness of records which will be used.

For each of the upper record supports, the shaft thereof is vertically slidable in the post. Therefore, if during a change cycle, the outer edge 36*b* of the upper support lug strikes some part of the central aperture of the lowermost record such as at point 53 in FIGURE 5, further rotation of the post will cause the lug edge 33*b* (and therefore the entire lug 23*b*) to be cammed upwardly by the sleeve aperture front edge 34, due to its compliance angle. This will cause the upper support lug 23*b*, for example, to be cammed upwardly in the event its outward action is restricted by the central aperture of the lowermost record and it will continue to move upwardly until it moves free of the upper edge of the lowermost record whereupon it will move into position under the next record 17*n*. In order to aid it in moving into position under the next record, both the rear edge 38*b* and the outer edge 36*b* are tapered forwardly and inwardly, respectively, as they extend upward from the lower face of the lug. So it is that when the post 19 begins to turn forward in the direction of the arrow 31, to initiate retraction of the lower support lugs, extension of the upper lugs is initiated and, if restricted by the lowermost record, these lugs will move up until they are able to move out past the lowermost record 17*b* and into position under the next record 17*n* before record 17*b* is released, thus assuring adequate support for the record stack when the lower supports are finally retracted to drop the bottom record onto the turntable.

In order to be sure that the upper supports return to their initial position after a change cycle, a coil spring is provided above each of the upper record shafts and is trapped between the upper end of the shaft and roof in the post. For example, the spring 54 is trapped between the upper end 56 of shaft 26*b* and a roof or top end 57 of the post groove in which the shaft 26*b* is disposed. These springs are made stiff enough and the compliance angle 48 is selected so as to insure that while the lug can travel up enough to clear the upper edge of the central aperture of the bottom record, it will not move upward so freely as to avoid the outward camming action immediately upon coming free of the bottom record. In this way it is guaranteed that the upper supports will move out to the temporary record stack supporting position as soon as it is physically possible for them to free themselves of confinement by the bottom record. To minimize wear on both the edge 33*b* of the lug 23*b* and on the sleeve aperture edge 34, an inclined face is provided on the front edge of the lug as shown in FIGURE 5.

As further shown in FIGURE 5, and as better shown in FIGURE 3, the post 19 has a face 19*f* which is horizontal and extends inward from the outer cylindrical surface of the lower portion 19*c* to the outer cylindrical surface of the portion 19*b*. This face provides the support for the lower support members, through the boss portions 47 thereof. For example, in the case of the support member having the abutment 47*b* on the boss portion 47 thereof, the lower face 47*f* of the boss portion rests on and is supported by the upper face 19*f* of the lower portion 19*c* of the post. The boss face 47*f* is of sufficient area to minimize wear both on the face itself and on the post face even though the record stack is supported thereby and even though the upper support member including lug 23*b*, shaft 26*b* and the downwardly biasing spring 54, is supported thereon. The support of the upper support member by the lower support member directly associated therewith by alignment of the shafts thereof is provided by the abutting of the meeting ends such as shown for the shaft 29*b* and shaft 26*b* where they abut at 58 in FIGURE 5. If desired, however, the support for the lower support lugs and their shafts and the shafts of the upper support lugs, as well as for the record stack can be provided by allowing the lower surface of each of the lugs to rest on the bottom margin of the sleeve aperture in which the lug is supported such as by the marginal edge 59 in FIGURE 5. The knurled cap 21 on the post was previously mentioned and, as shown in FIGURE 5 it can be affixed to the top end of the post by a transverse pin 61. The lower face 61*f* of this cap can rest on the upper face 16*f* of the sleeve and thus support the entire cap and post and record support assembly, as well as the stack of records and provide the vertical thrust bearing means for this. A variety of other means may also be employed if desired, and a snap ring 62 may be provided in a circular groove in the post 19 (FIGURE 1) if desired to prevent the post from working up out of the sleeve. So it is seen that the cap can serve as a thrust bearing as well as a convenient means for manually turning the post with respect to the sleeve, to effect the change of the record, without actuating the changer mechanism. Moreover, this manual operation can be performed regardless of what the position of the changer mechanism may be, and so is independent of whether or not the record player might have been stopped in the middle of a change cycle. The reason for this can be appreciated upon reference to FIGURE 1A representing schematically a top view of the lower end portion of the post 19 and the operating lever 27. As described above, turning of the post, and therefore the lever, approximately 35° in the direction of the arrow 31, for example, is sufficient to effect the drop of a record in the illustrated embodiment. A number of conventional changer mechanisms are provided with a reciprocable slotted link 63 having a slot 64 therein which can conveniently receive a pin or rivet 66 of the lever 27 of the present invention. When the changer mechanism cycles to pull the link 63 in the direction of the arrow 67, it simply turns the arm 27 and the post 19 therewith sufficiently (35°, for example) to retract the lower and extend the upper support lugs. If the mechanism happens to be stopped part way, it is still possible to turn the cap 21 manually whereupon the pin 66 will slide along the slot 64 and still effect the drop of a record regardless of the position at which the changer mechanism might have stopped.

For better control of the apparatus, a post return spring 68 may be provided between the lever 27 and the baseplate or a bracket 69 affixed thereto, to return the lever arm from the dotted outline position it takes during the drop of a record, to the original position shown by the solid outline. An abutment post 71 may also be provided to stop the return travel of the arm if it is preferred not to rely on the abutment bosses of the record supports for stopping rotation of the post. Thus, during the normal automatic cycling of the changer mechanism, the link 63 will be pulled in the direction 67 and turn the post the desired amount, and will then return in the direction of the arrow 72 and thus allow the lever arm 27 and the spindle post to again return to the original position. The slot permits manual turning of the post by the cap 21 in the direction of the arrow to be accomplished without bothering the changer mechanism 25 because the motion of the actuator arm is lost (so far as the changer mechanism is concerned) as the pin 66 slides along the slot.

In a number of conventional record changers, it is necessary to remove the spindle assembly to remove the records from the turntable after they have been played. This is undesirable because it creates the possibility of loss of the spindle, rendering the record player useless for changing records and virtually useless for even playing a record, unless some other piloting means for a record on the turntable can be provided. Features of the present invention enable removal of a complete stack of records from the turntable without removing or even manipulating any part of the spindle by hand. Whichever record support lugs are extended at the time the stack is lifted along the spindle from the turntable will be retracted by the stack of records as it passes the lugs during the lifting of the stack from the turntable. This is accomplished in a manner which will now be described.

Assume first that all of the records on the spindle have been played and are resting on the turntable, and that the lower record support lugs are extended as shown in FIGURES 2, 3, 4 and 5. As the records are lifted from the turntable, the upper face of the uppermost record will first engage the lower faces of the three lower record support lugs. Further lifting of the records will cause the leading edge 43a of the lug 18a, for example, to strike the aperture edge 73 (FIGURE 5) as the outward force exerted by the records on the lugs slides them upwardly in their grooves. Further upward sliding will result in the aperture edge 73 camming the lower support lugs inwardly in the direction of the arrow 74 in FIGURE 4 so that they are cammed inwardly and out of the way of the records as they are pulled upward on the spindle. The upward and forward incline of the aperture edge 76 parallel to aperture edge 73 accommodates this action of the lower support lug 18a. The same action occurs simultaneously on the other lower record support lugs. During the upward sliding of the lower support lugs to cam them inwardly and out of the way, the upper lugs must also slide upwardly because the shafts abut. However, sufficient overall horizontal clearance between the edges of upper lug 23b and aperture edges 37 and 34, for example, as well as the much steeper slope of the incline of the upper aperture edge 37 by comparison with the shallow incline of the edges 76 and 73 (compliance angle 48 being much larger than angle 75) more than doubles the rate of retraction of the lower support lugs by comparison with that which could be expected on the upper support lugs even if no clearance at all were provided between the aperture edge 37 and leading edge 38b of the upper support lug 23b. Moreover, if desired for this purpose, the abutment surface 32b of the upper support lug 23b could be contoured to permit still greater retraction of the upper lug than is represented in FIGURE 4, during the upward sliding which would occur as the lower lugs are retracted as the records are pulled upwardly from the turntable and off the spindle.

If it happens that it is desired to remove the stack of records while the changer mechanism is in the middle of a change cycle, regardless of whether the changer is being automatically operated at that time, the records will naturally pass the retracted lower supports without interference. When the upper face of the uppermost record contacts the lower faces of the extended upper supports, they will be slided upwardly and the aperture edge 37, for example, will be engaged by the leading edge 38b of the upward sliding lug 23b, for example, and will cam it inwardly upon further upward sliding of the lug caused by pulling the records up against it as they are pulled off the spindle.

From the foregoing, it can be seen that the present invention provides great versatility in the use of a player-changer and enables the installation, playing, and removal of one record at a time either manually or automatically, as well as enabling the playing of records manually or automatically from a stack of records mounted on the spindle.

Referring now to FIGURES 7 through 10, the utility of the spindle of the present invention with an adapter for records having a large center hole, is demonstrated. The records contemplated and requiring the adapter of these figures are typically the 45 r.p.m. records. Although the typical outside diameter of the sleeve of the invention described heretofore is nominally $\frac{9}{32}$ inch, the adapter for 45 r.p.m. records needs to be approximately $1\frac{15}{32}$ inches in diameter.

Referring now more specifically to FIGURES 7 through 10, the adapter may include a two-piece molded plastic body, for example, with the upper piece 81 secured to the lower piece 82 by screws 83. The lower piece has a key member 84 extending thereacross at the lower margin thereof which is received in a slot 86 of a collar 87 affixed to the sleeve 16 of the spindle assembly. In this way the adapter body is prevented from rotation and is supported properly on the spindle assembly.

Figures 7, 8, 9, 10:
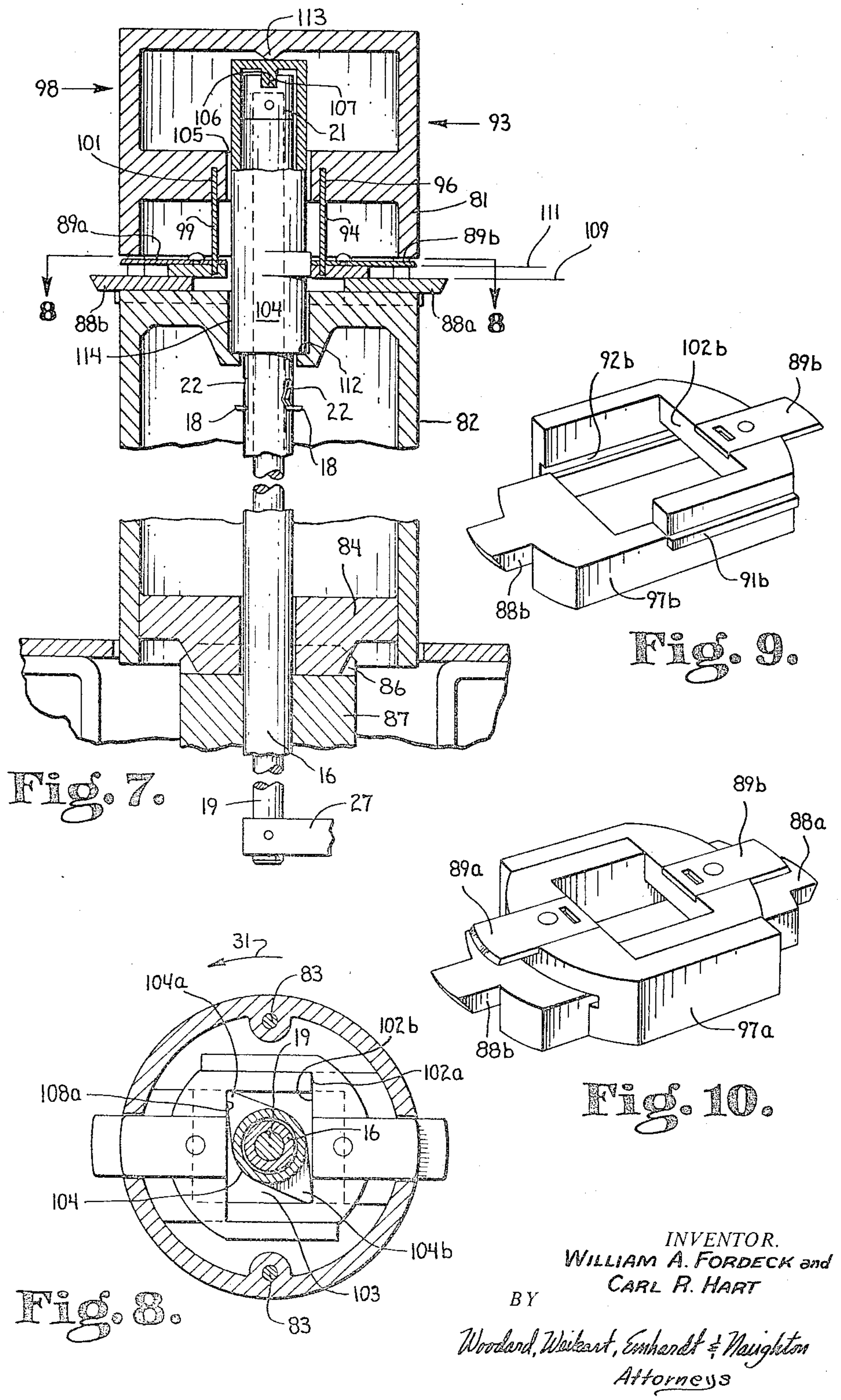
FIGURE 7 is an elevational view (on a scale intermediate that of FIGURE 1 and FIGURES 2 and 3) showing the spindle of the typical embodiment with a 45 r.p.m. record adapter thereon according to another feature of the invention.
FIGURE 8 is a cross-section at line 8—8 in FIGURE 7, viewed in the direction of the arrows.
FIGURE 9 is an enlarged pictorial view of half of the record support apparatus of the adapter.
FIGURE 10 is an enlarged pictorial view of both halves of the record support apparatus of the adapter, assembled together.

The adapter includes lower and upper record supports, the lower record supports lugs 88a and 88b being normally extended to the position shown in FIGURES 7 and 8 to provide the primary support for a record on the adapter. However, when these support lugs are retracted, the upper record support lugs 89a and 89b are extended to support all but the lowermost record in the stack. For convenience, the lower support lug 88a and upper support lug 89*a* are both parts of a single unit as are the support lugs 88*b* and 89*b*. This is better illustrated in FIGURE 9 where support lug 88*b* and support lug 89*b* are part of a unit having a horizontally extending key 91*b* and a horizontally extending groove 92*b*. This lug unit is mounted for horizontal reciprocation in the adapter body and is normally biased in the direction of the arrow 93 by a spring member 94 affixed in the adapter top piece 81 at 96. In this way, lug 89*b* is normally retracted and 88*b* is normally extended.

FIGURE 10 shows the assembly of two of these lug units wherein the lugs 88*a* and 89*a* are part of a unit 97*a* identical to the unit 97*b* and horizontally slidable thereon by the interfitting of the respective grooves and keys such as 92*b* and 91*b* of the lug unit 97*b* of FIGURE 9. The lug unit 97*a* is normally biased in the direction of the arrow 98 by means of the spring 99 affixed in the top piece of the adapter body at 101.

From the foregoing description, it can be seen that the lug units 97*a* and 97*b* are actually slides biased toward the spindle by means of the springs 94 and 99. Their travel toward the center is limited by the abutment between facing abutment surfaces 102*a* and 102*b* of the slides 97*a* and 97*b*, respectively. This results in a central aperture 103 accommodating a cam-and-sleeve unit 104 received on the spindle 16 and having a depending key 106 received in the slot 107 in the spindle cap.

It may be recalled that in order to change a record with the spindle of the present invention, the spindle was rotated to a limited extent in the direction of the arrow 31. This same motion is effective to change records when th adapter of FIGURES 7 through 10 is used. This is because the cam 104*a* engages the face 108*a* of the slide 97*a*, and the cam 104*b* engages the face 102*b* of the slide 97*b*. Therefore, as the post turns in the direction of the arrow 31, its cap 21 turns likewise causing the cam-and-sleeve unit 104 of the adapter to turn likewise, by reason of the reception of the key 106 of the cam-and-sleeve member of the adapter being received in the key way 107 of the spindle cap 21. Turning of the post therefore urges the slides against their spring biases such that as the lower lugs 88*a* and 88*b* are retracted, the upper lugs 89*a* and 89*b* are extended. The vertical spacing between the plane 109 of the upper faces of the lower record support lugs and the plane 111 of the outermost tips of the upper lugs is such that the upper lugs will enter the space between the lowermost record and the next lowermost record as the lower lugs are being withdrawn from beneath the lowermost record. Then, after completion of the change cycle, the springs 94 and 99 have again returned the lugs to their initial position as shown in FIGURES 7 and 8.

In the illustrated example, the cam-and-sleeve member 104 is supported between the boss 112 of the lower piece and the boss 113 of the upper piece of the adapter and is typically held coaxial with the body by the radial bearing points at 105 and 114. The device slides down over the spindle of the present readily and need not interfere with the upper or lower record support lugs of that spindle. However, if it is desired to extend the cam-and-sleeve member 104 down further on the spindle assembly, the inside diameter thereof can be made large enough to accommodate the extended record support lugs of the spindle assembly itself without interference and without damage.

From the foregoing description, it will be readily apparent that a variety of configurations can be adopted for the spindle assembly and adapter assembly of the present invention, and still be within the scope of the present invention. Therefore, while the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A record changer spindle comprising:
an elongated post having a generally upstanding axis;
a first record support member having a first record support lug projecting laterally from said post, said lug being mounted to enable it to support phonograph records;
first cam means external to said post and adjacent said lug;
said post and cam means being mounted to permit relative rotation therebetween about said axis;
and means mounting said first support member relative to said post and to said cam means so as to enable retraction of said support lug by said cam means from laterally projecting relationship with said post to temporarily disable said support member from supporting phonograph records.

2. The spindle of claim 1 and further comprising:
an elongated spindle sleeve encircling said post, said sleeve having an aperture therein receiving said support lug, said cam means comprising a first side marginal edge of said aperture engageable with said support lug upon relative rotation between said post and said sleeve to thereby retract said support lug into said sleeve.

3. The spindle of claim 2 wherein:
said post has a portion extending outside said sleeve at a point above a record stack supported by said first lug and thereby easily operable manually by the fingers of one hand to cause relative rotation between the post and the sleeve for retraction of said first lug.

4. The invention of claim 3 and further comprising:
a power driven changer mechanism;
means coupling said spindle to said changer mechanism, said changer mechanism being operable when actuated to effect relative rotation between the post and sleeve for first retracting said first lug to effect the drop of a record thereby, and then re-extension of said first lug during an automatic change cycle of the mechanism.

5. The invention of claim 4 wherein:
said coupling means includes a lost motive device to enable the said manual operation of said post portion for retraction of said first lug regardless of the state-in-cycle of said changer mechanism.

6. The invention of claim 5 and further comprising spring return means coupled to said post to return it toward the initial, first-lug-extending position.

7. The invention of claim 2 and further comprising:
and adapter body slidable down over said spindle;
means coupling said adapter body to said spindle sleeve to prevent relative rotation therebetween;
an adapter sleeve disposed in said body and around a portion of said post;
means coupling said adapter sleeve to said post to prevent relative rotation therebetween;
record support lug means movably mounted in said adapter body;
and cam means on said adapter sleeve and operable on said support lug means during relative rotation between said post and said spindle sleeve to effect the drop of a designated record from a stack to effect a record change.

8. The invention of claim 2 and further comprising:
a collar affixed to said sleeve and having first slot means therein;
an adapter body mounted over said spindle and having first key means received in said first slot means preventing relative rotation between said sleeve and said adapted body;
an adapter sleeve disposed in said body and around a portion of said post and keyed to said post to prevent relative rotation between said post and said adapter sleeve;

record support slides mounted in said adapter and having primary and secondary record support lugs thereon, said primary lugs being normally extended for support of a stack of records on said adapter, and said secondary lugs being normally retracted;

said adapter sleeve having cams thereon operable against said slides upon relative rotation between said post and said spindle sleeve to thereupon extend said secondary lugs and retract said primary lugs to drop a record onto a record playing turntable.

9. The invention of claim 8 and further comprising:

springs mounted in said adapter body and engaging said slides and normally urging said slides to a condition of abutting inter-engagement of selected facing surfaces thereof to normally locate said primary lugs in extended position projecting beyond outer margins of said adapter to support a stack of records on said adapter, and to normally retract said secondary lugs within outer margins of said adapter.

10. The spindle of claim 1 wherein:

said post includes a recessed portion and said support lug is receivable in said recessed portion for nesting therein upon retraction of said support lug.

11. The spindle of claim 1 wherein:

said post includes an elongated groove therein extending generally parallel to said axis;

said support member having a shaft received in said groove and extending therealong and rotatable in said groove, said support lug projecting laterally from said shaft.

12. The spindle of claim 11 wherein:

said shaft is slidable along said groove and said cam means is contoured to effect retraction of said support lug upon upward sliding of said shaft, to facilitate upward removal of records from below said lug past said lug and off the spindle without necessitating relative rotation between said cam means and said post.

13. The spindle of claim 12 and further comprising:

spring means received in said post and urging said shaft downwardly to normally maintain said support lug extended.

14. The spindle of claim 1 and further comprising:

a second record suport member having a second record support lug normally retracted and thereby normally indisposed for supporting a stack of records;

second cam means external to said post and adjacent said second lug and mounted to permit relative rotation between said post and said second cam means about said axis;

and means mounting said second support member relative to said post and to said second cam means so as to enable extension of said second support lug by said second cam means to project laterally from said post for supporting a stack of records when said first support is retracted.

15. The spindle of claim 14 wherein:

said first and second cam means, said first and second lugs, said mounting means and said post are so related as to effect simultaneously said rotational retraction and rotational extension of said first and second lugs respectively upon a single limited relative rotation between said post and said first and second cam means.

16. The spindle of claim 14 wherein:

said post includes first and second elongated grooves therein extending generally parallel to said axis;

said first support member having a first shaft received in said first groove and extending therealong and rotatable in said first groove, said first lug projecting laterally from said first shaft;

said second support member having a second shaft received in said second groove and extending therealong and rotatable in said second groove, said second lug projecting laterally from said second shaft.

17. The spindle of claim 16 wherein:

said shafts are slidable along said grooves and said first and second cam means are contoured to effect retraction of an extended support lug upon upward sliding of the shaft of the support member of which the extended lug is a part, to facilitate upward removal of records from below said lugs past said lugs and off the spindle without necessitating relative rotation between said post and said first and second cam means.

18. The spindle of claim 17 and further comprising:

first and second spring means downwardly urging said first and second shafts, respectively.

19. The spindle of claim 14 wherein:

said first and second record support members are identical.

20. The spindle of claim 14 and further comprising:

a sleeve encircling said post, said sleeve having an aperture therein receiving said first and second support lugs;

said first cam means comprising a first side marginal edge of said aperture engageable with said first lug upon rotation of said post in a first direction relative to said sleeve, and operable upon said first lug during said rotation of said post in said first direction to retract said first lug into said sleeve;

and said second cam means comprising an extension of said first side marginal edge upward from said first cam means, said extension being engageable with said second lug and operable thereupon during said rotation of said post in said first direction to move said second lug outwardly through said aperture to extended position to support phonograph records.

21. The spindle of claim 20 wherein said mounting means for said first and second support members include:

upwardly extending grooves in said post, and shafts on said support members and received in said grooves, said sleeve retaining said shafts in said grooves, and said shafts being rotatable in said grooves to enable pivoting of said lugs between retracted and extended positions.

22. The spindle of claim 20 wherein:

said mounting means for said first support member includes a first upwardly extending groove in said post and a first shaft on said first mounting member received in said first groove, said first shaft being rotatable in said groove to enable pivoting of said first support lug between extended and retracted position;

said mounting means for said second support member includes a second upwardly extending groove in said post and a second shaft, said second shaft being on said second mounting member and received in said second groove, said second shaft being rotatable in said second groove;

said grooves and thereby said shafts having generally upstanding axes horizontally spaced in said post.

23. The invention of claim 20 and further comprising:

a third support lug mounted and operated like said first lug and a fourth support lug mounted and operated like said second lug, said first and third lugs normally providing primary support means for the record stack and said second and fourth lugs providing secondary support means for the record stack during the drop of a record by said primary means;

said sleeve having a second aperture therein like said first aperture and circularly spaced therefrom and receiving said third and fourth support lugs.

24. The spindle of claim 20 wherein:

said first cam means includes a lower portion of said first side marginal edge, said lower portion extending rapidly upwardly and slightly in a direction opposite said first direction to initiate retraction of said first lug during upward movement thereof caused by application of an upward force thereon as by pulling a record up against it upon removal of the record from a turntable concentric with the spindle and below the support lugs;

said first cam means including an intermediate portion of said first side marginal edge, said intermediate portion extending upwardly and substantially in a direction opposite said first direction to effect rapid retraction of said first lug during further upward movement thereof caused by pulling a record up against it;

said upward extension of said first side marginal edge extending upwardly and in said first direction to effect upward sliding of said second lug during rotation of said post in said first direction whenever outward extension of said second lug is precluded by abutment with the central aperture wall of a record supported on said first lug;

the inclination of said upward extension being less than that of said intermediate portion of said edge whereby the retraction rate on said first lug is greater than the retraction rate of said second lug in the event both lugs are simultaneously moved upward by upward movement of a record during withdrawal of the record from the turntable and spindle.

25. The spindle of claim 14 wherein:

the vertical distance between a plane containing the record supporting upper surface of said first support lug and a leading edge of the second support lug is normally less than the thickness at the central aperture of the thinnest record which is to be played;

said second support lug being upwardly slidable;

said second cam means being shaped to urge said second support lug in outward and upward directions upon relative rotation between said post and said post and said second cam means in a first direction to thereby urge said second lug upward to a level free of blockage by a lowermost record supported on said first lug and thereupon urge said second lug outward under a second record theretofore resting on the lowermost record to thereupon support the second record.

26. The spindle of claim 25 and further comprising:

resilient biasing means urging said second lug downward;

said biasing means and the shape of said second cam means being arranged to minimize upward movement and maximize outward movement of said second lug unless the outward movement thereof is prevented by abutting engagement with the central aperture wall of the lowermost record, to thereby assure that outward movement of said second lug is effected upon said relative movement between said post and second cam means, in said first direction, as soon as said second lug has freed itself from abutting engagement with the central aperture of the lowermost record.

27. A record changer combination comprising:

a base plate having a turntable mounted for rotation thereon to support a phonograph record as it is played, and having an automatic, power-operated record changer drive mechanism thereon operable, when actuated, to drive a link back and forth in substantially linear fashion one time for a change cycle of the said changer mechanism;

an upstanding post having a longitudinal axis colinear with the rotational axis of said turntable, said post extending below said turntable and said baseplate and mounted to rotate in a first direction from a support position to a release position upon actuation thereof by said changer drive mechanism, said post having an operating lever arm thereon with a drive pin extending therefrom generally parallel to the post axis;

a cylindrical sleeve encircling a substantial portion of said post and concentric therewith and affixed with respect to said baseplate;

a plurality of identical circularly spaced apertures in the wall of said sleeve disposed at a uniform elevation above the plane of said turntable, each of said apertures having a lower marginal edge lying in a first horizontal plane, and each aperture having front and rear side marginal edges, the front side marginal edge beginning at a first point of intersection with the lower marginal edge and extending upwardly and rearwardly at a first acute angle measured with respect to said lower marginal edge and continuing to a second point, and then extending from said second point rearwardly at a second acute angle measured clockwise with respect to a second horizontal plane containing said second point, said second angle being much smaller than said first acute angle, and said front side edge continuing to a third point, and then extending from said third point at an obtuse angle measured clockwise with respect to a third horizontal plane containing said third point, the difference between said obtuse angle and 180° being much greater than said second acute angle;

a plurality of circularly spaced upstanding grooves of semicircular cross-section provided in said post;

a first plurality of lower record support members of identical construction, said lower support members including upstanding shafts, each shaft received in one of said grooves and rotatable therein and confined therein by said sleeve, and each support member including a boss projecting outwardly from said shaft and each support member including a support lug, the support lug of each different member of said first plurality of support members being received in and normally projecting outwardly through a different one of said apertures in said sleeve and resting with its lower face near the lower marginal edge of the aperture, the boss of each support member having a lower bearing face resting on an upper bearing face of a recessed portion of said post, whereby said support members and the lugs thereof are vertically supported to enable them to support on their upper surfaces the lowermost record of a stack of circular phonograph records having central apertures received on and pivoted on said sleeve, and thereby support the stack of phonograph records;

a second plurality of record support members, each support member of said second plurality being identical to the support members of said first plurality but inverted so that the shafts thereof are disposed principally upward from the support lugs thereof, the shaft of each different support member of said second plurality being disposed in a different one of said grooves of said post and aligned with and supported by the shaft of a support member of the first plurality, the lugs of said second plurality being normally retracted and disposed in said recessed portion of said post, each lug of said second plurality being disposed at an elevation above the lugs of said first plurality and immediately above said third horizontal plane, while said lugs of said first plurality are disposed between the lower edge of said apertures and said second horizontal plane, whereby the lugs of said first plurality are lower support lugs and the lugs of said second plurality are upper support lugs, the shaft of the support member for each upper support lug being located so as to approach the aperture through which the lug thereon is received, during rotation of said post in said first direction, to engage the front edge of the lug with the portion of the aperture front edge above said third plane to thereupon urge the upper support lugs outwardly, and the shaft of each lower support lug being located to depart from the aperture through which the lug thereon is received, as said post turns in said first direction, to engage the front edge of the lower lug with the leading edge of said aperture and effect an inward turning of the lower lug into said recessed post portion for retraction of the lower lug simultaneously with extension of the upper lug projecting through the same aperture, to enable the dropping of the lowermost record of a stack of records normally supported by the lower lugs while securing retention and support of the remaining records of the stack by the upper lugs;

said shafts being upwardly slidable in said grooves whereby said lugs are generally upwardly slidable in said apertures;

the angle of inclination of said front edge of the apertures above said third plane being such as to encourage upward movement of the upper lugs upon turning of said post in said first direction in the event that outward movement of said upper lugs is prevented by engagement thereof with the wall of the central aperture of the lowermost record supported on the lower lugs, to enable the upper lugs to move upwardly free and clear of interference with the lowermost record so as to enable them to thereupon move outwardly under the next lowermost record and support the stack of records when the lower lugs are retracted to release and drop the lowermost record onto said turntable;

a plurality of springs disposed in said grooves above the shafts of the upper support lugs and urging them downwardly to insure that upward motion of the upper lugs occurs only in the event that outward motion thereof is prevented, during rotation of said post with respect to said sleeve in said first direction;

the inclination of the front edge of said apertures between said second plane and said third plane being shallow so as to encourage rapid retraction of the lower lugs upon the exertion of an upward thrust thereon by pulling a record up along the spindle from the turntable into engagement with the undersides of the lower lugs so as to cause them to retract and enable passage of the record further up off the spindle, the inclination of said aperture edge above said third plane and the fit of said upper lugs in said apertures above said third plane minimizing the additional inward retraction of said upper lugs during the upward pushing thereof as the lower lugs are moved upward during rotation thereof as a stack of records is pulled up along the spindle from the turntable for withdrawal from the spindle;

said lugs having slanted front and rear edges to facilitate movement of said upper lugs into position between the lowermost and second lowermost record of a stack and facilitate sliding thereof along the sleeve aperture edges without excessive wear thereon;

a portion of said post projecting upwardly beyond said sleeve and thereby accessible for turning by the fingers to enable the turning of the post in said first direction manually as desired to effect the drop of a single record from the stack at any time desired;

said changer mechanism having a drive member with an elongated slot therein, said slot being received on the drive pin of said post operating lever arm and said link being normally disposed to enable sliding of said pin in said slot during turning of said post in said first direction by manually turning said upwardly projecting portion of said post, said travel of said pin in said slot accomplishing a lost motion effect whereby operation of said changer mechanism upon turning of said post in said first direction is avoided, said post having biasing means associated therewith to return said post from said release position to said support position at all times other than when said post is intentionally being turned in said first direction.

28. The invention as set forth in claim 27 and further comprising:

an adapter body slidable down over said spindle;

means coupling said adapter body to said spindle sleeve to prevent relative rotation therebetween;

an adapter sleeve disposed in said body and around a portion of said post;

means coupling said adapter sleeve to said post to prevent relative rotation therebetween;

record support lug means movably mounted in said adapter body;

and cam means on said adapter sleeve and operable on said support lug means during relative rotation between said post and said spindle sleeve to effect the drop of a designated record from a stock to effect a record change.

References Cited

UNITED STATES PATENTS

| | | | |
|---|---|---|---|
| 2,643,127 | 6/1953 | Gregg et al. | 274—10 |
| 2,898,117 | 8/1959 | Vistain | 274—10 |

FOREIGN PATENTS

| | | |
|---|---|---|
| 884,356 | 4/1943 | France. |

HARRY N. HAROIAN, *Primary Examiner.*

UNITED STATES PATENT OFFICE
CERTIFICATE OF CORRECTION

Patent No. 3,369,815 February 20, 1968

William A. Fordeck et al.

It is hereby certified that error appears in the above numbered patent requiring correction and that the said Letters Patent should read as corrected below.

Column 3, line 13, for "turnable" read -- turntable --; column 4, line 61, for "as" read -- an --; column 5, line 23, for "lub" read -- lug --; column 8, line 69, for "supports" read -- support --; column 9, line 32, for "th" read -- the --; column 10, line 42, for "motive" read -- motion --; line 51, for "and" read -- an --; column 13, line 37, strike out "said post"; column 14, line 46, for "pivoted" read -- piloted --; column 15, line 47, for "rotation" read -- retraction --; column 16, line 39, for "stock" read -- stack --.

Signed and sealed this 27th day of May 1969.

(SEAL)
Attest:

EDWARD M. FLETCHER, JR.
Attesting Officer

Commissioner of Patents